United States Patent
Tanaka

(10) Patent No.: US 8,094,536 B2
(45) Date of Patent: Jan. 10, 2012

(54) REPRODUCING APPARATUS

(75) Inventor: Yasuyuki Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 600 days.

(21) Appl. No.: 12/263,327

(22) Filed: Oct. 31, 2008

(65) Prior Publication Data

US 2009/0116357 A1 May 7, 2009

(30) Foreign Application Priority Data

Nov. 1, 2007 (JP) ................................. 2007-285166

(51) Int. Cl.
*G11B 7/00* (2006.01)
(52) U.S. Cl. .................. 369/59.22; 369/59.21
(58) Field of Classification Search ............... 369/59.21, 369/59.22
See application file for complete search history.

(56) References Cited

U.S. PATENT DOCUMENTS

| | | | | |
|---|---|---|---|---|
| 6,834,035 | B1 * | 12/2004 | Marukawa et al. | 369/59.22 |
| 6,914,867 | B2 * | 7/2005 | Tonami | 369/59.22 |
| 7,372,797 | B2 * | 5/2008 | Kanaoka et al. | 369/59.22 |
| 2003/0058352 | A1 | 3/2003 | Nishijima | |
| 2005/0018578 | A1 * | 1/2005 | Ogura et al. | 369/59.21 |

FOREIGN PATENT DOCUMENTS

JP 2003-101926 4/2003

* cited by examiner

*Primary Examiner* — LaTanya Bibbins
(74) *Attorney, Agent, or Firm* — Canon USA Inc IP Division

(57) ABSTRACT

In a reproducing apparatus, a reading unit reads an information signal from a storage medium, and a converter converts the information signal reproduced by the reading unit into a first digital signal by sampling the information signal in accordance with a reference clock signal with a predetermined frequency higher than the frequency of the information signal. An oversampling unit generates a second digital signal by increasing the number of samples of the first digital signal output from the converter. A data detector selects two adjacent samples from the second digital signal on the basis of the frequency of the information signal reproduced by the reading unit and a phase change of the information signal. The data detector then generates read data using the selected samples of the digital signal.

12 Claims, 9 Drawing Sheets

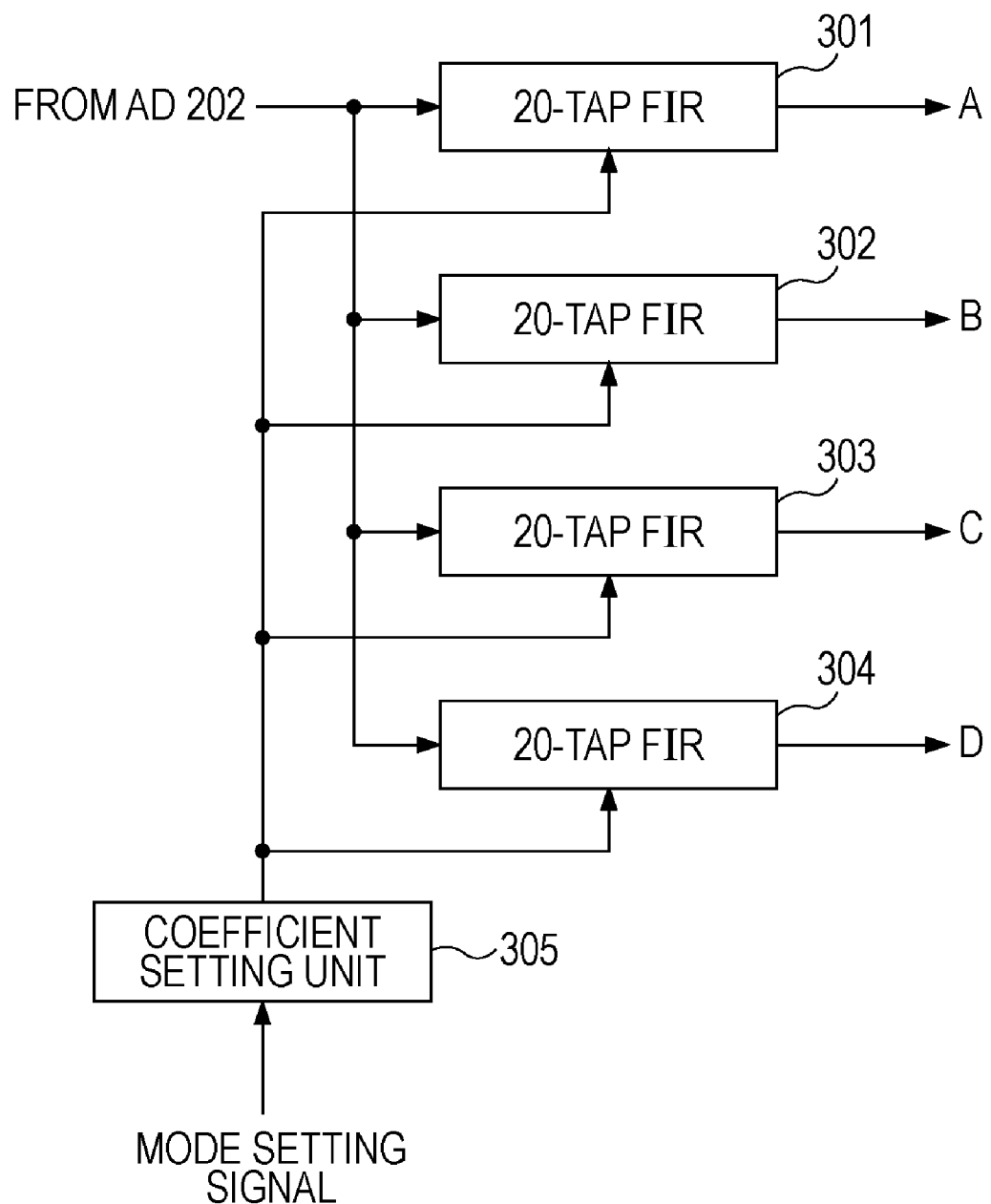

US 8,094,536 B2

REPRODUCING APPARATUS

BACKGROUND OF THE INVENTION

1. Field of the Invention

The present invention relates to a reproducing apparatus, and more particularly, to an apparatus configured to generate reproduced data from an information signal stored in a storage medium.

2. Description of the Related Art

An apparatus is known which is configured to record/reproduce data on/from an optical disk such as a DVD.

A small-size disk with a diameter—as small as 8 cm has been developed for use with a video camera. Video cameras are now available which are designed to record video/audio data on such an 8-cm disk (see, for example, Japanese Patent Laid-Open No. 2003-101926).

In recent years, it has become popular to read data from a DVD at a reading rate 2 or 4 times higher than a normal rate. Apparatuses capable of reading data at a higher rate such as that 8 or 16 times the normal rate are also available.

In disk apparatuses such as a disk video camera, when a signal recorded on a disk is reproduced, a clock signal is generated in synchronization with a signal read from the disk, and the read signal is converted into a digital signal in accordance with the clock signal thereby to reconstruct original data.

To convert the detected signal read from the disk into the digital signal, an analog-to-digital converter is necessary. In the analog-to-digital conversion, a prefilter is used to reduce frequency components in an unnecessary frequency band.

If the rate at which the data is read from the DVD is switched, a change occurs in the frequency band of the reproduced data, and thus it is necessary to change the frequency band of the prefilter depending on the data reading rate.

Therefore, in order to make it possible to detect original data at various data reading rates, it is necessary to perform an analog-to-digital conversion for signals read at various data reading rates, and thus the reproducing apparatus needs to include a plurality of analog prefilters corresponding to the respective reading rates.

SUMMARY OF THE INVENTION

The present invention provides an apparatus capable of accurately detecting reproduced data at timing points synchronous to an information signal by using a digital circuit that can be realized without causing a significant increase in a circuit scale or cost.

According to an aspect of the present invention, a reproducing apparatus includes a reading unit configured to read an information signal from a storage medium, a conversion unit configured to convert the information signal into a first digital signal by sampling the information signal in accordance with a reference clock signal with a predetermined frequency higher than the frequency of the information signal, a sample increasing unit configured to produce a second digital signal by increasing the number of samples of the first digital signal output from the conversion unit, and a data detection unit configured to generate reproduced data by selecting two adjacent samples from the second digital signal on the basis of a frequency of the information signal read by the reading unit and a phase change of the information signal and then generating the reproduced data using the selected samples of the digital signal.

Further features of the present invention will become apparent from the following description of exemplary embodiments with reference to the attached drawings.

BRIEF DESCRIPTION OF THE DRAWINGS

FIG. 3 is a block diagram illustrating a configuration of a digital filter.

DESCRIPTION OF THE EMBODIMENTS

Figure 1:
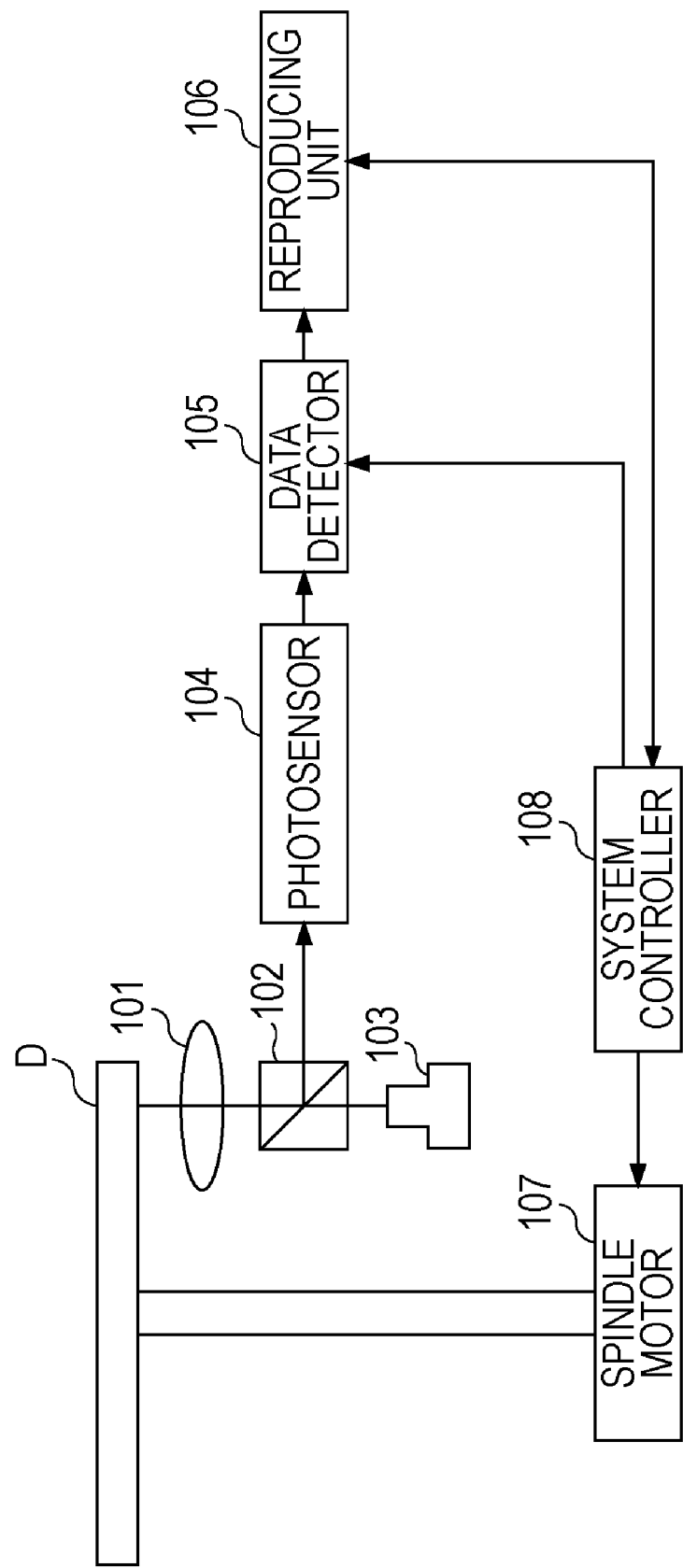
FIG. 1 is a block diagram illustrating a configuration of a reproducing apparatus according to an embodiment of the present invention.

FIG. 1 is a diagram illustrating a configuration of a reproducing apparatus according to an exemplary embodiment of the present invention.

In FIG. 1, D denotes an optical disk. In the present embodiment, a DVD disk is employed as the optical disk D. A spindle motor 107 drives the disk D so as to rotate at a predetermined velocity. In the present embodiment, the reproducing apparatus has two reading modes, i.e., 2× and 4× reading modes. In the 4× reading mode, the disk D is rotated at a velocity 4 times the normal velocity, and data is read while rotating the disk D at this velocity. In the 2× reading mode, data is read from the disk D rotated at a velocity 2 times the normal velocity. The mode may be switched by a user or may be automatically switched by a system controller 108.

A laser driver 103 illuminates the disk D by a laser beam via a splitter 102 and a lens 101. Light is reflected by the disk D, and the reflected light is directed to a photosensor 104 by the splitter 102. The photosensor 104 detects the reflected light and converts it into an electric signal. The resultant electric signal is supplied to a data detector 105. The data detector 105 detects digital data from the signal output from the photosensor and supplies the detected digital data to a reproducing unit 106. In the present embodiment, motion data or audio data is stored in a compressed/decoded form on the disk D. The reproducing unit 106 reproduces information data such as image data or audio data from the digital data detected by the data detector 105, and outputs the reproduced information data. The system controller 108 controls various parts of the reproducing apparatus in accordance with a command issued by a user by operating an operation switch (not shown). More specifically, for example, the system controller 108 controls the rotation speed of the spindle motor 107 in accordance with the reading rate at which data from the disk D is read, and outputs center frequency information of read data depending on the reading rate to the data detector 105.

The data detector 105 is described in further detail below.

Figure 2:
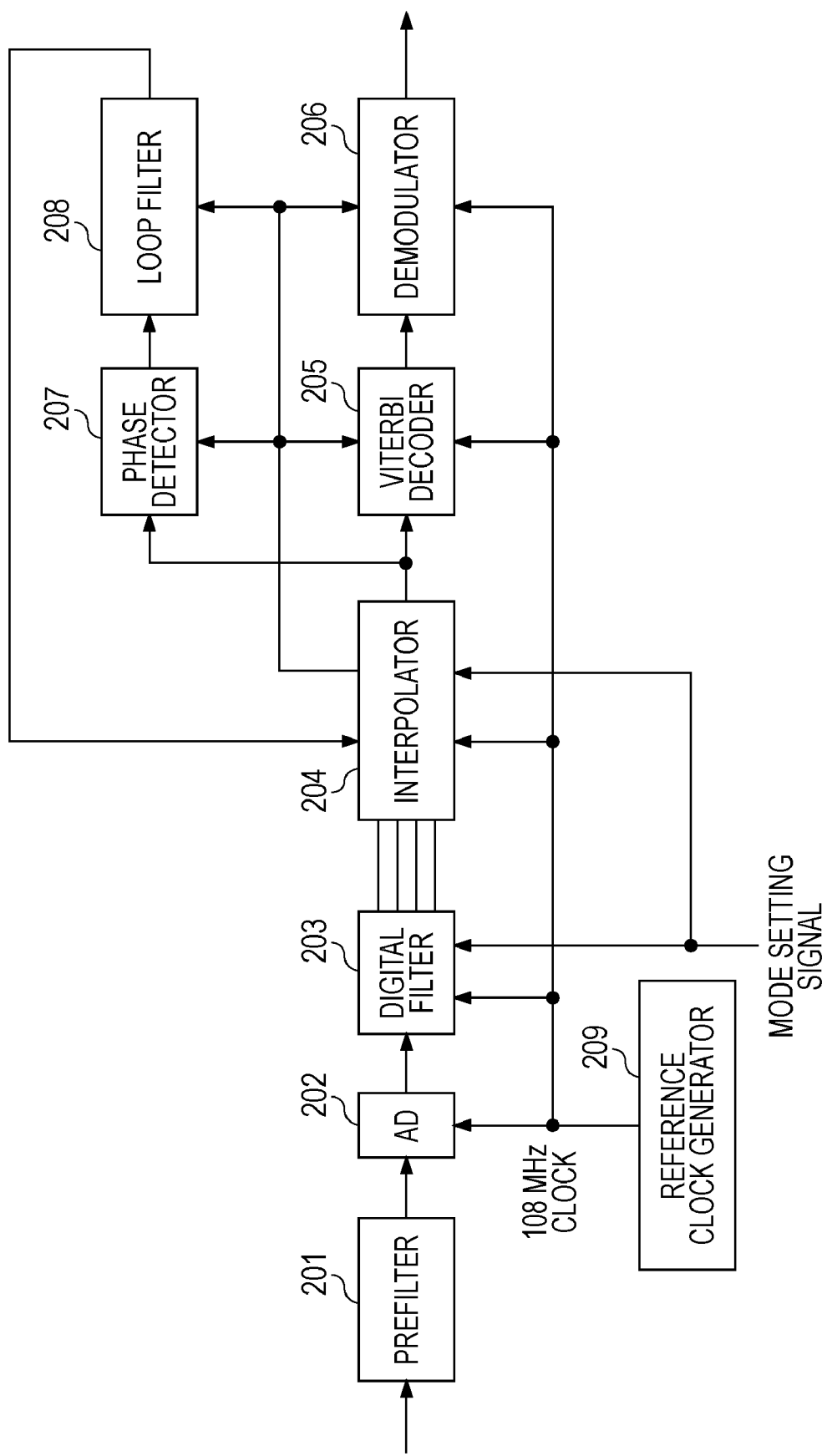
FIG. 2 is a block diagram illustrating a configuration of a data detector.

FIG. 2 illustrates a configuration of the data detector 105.

In FIG. 2, the signal output from the photosensor 104 is input to a prefilter 201. The prefilter 201 removes unnecessary frequency components, i.e., high-frequency components. The prefilter 201 functions as an anti-alias filter adapted to remove signal components in a frequency band higher than one-half the sampling frequency of an analog-to-digital converter 202 so that the digital signal output from the analog-to-digital converter 202 includes no alias high-frequency components.

In accordance with a reference clock signal, the analog-to-digital converter 202 performs sampling on the detected signal subjected to the filtering by the prefilter 201. As a result, each sample is converted into a digital signal (each sample of which has n bits, where n is an integer equal to or greater than 2), and the resultant digital signal is supplied to a digital filter 203. In the case of the 4× reading mode, the detected signal input to the prefilter 201 has a frequency of 101.6 MHz. In the case of the 2× reading mode, the detected signal input to the prefilter 201 has a frequency of 50.8 MHz that is one-half the frequency in the 4× reading mode. A reference clock signal with a frequency of 108 MHz is generated by a reference clock generator 209 and supplied to the analog-to-digital converter 202. In accordance with this reference clock signal of 108 MHz, the analog-to-digital converter 202 performs the sampling on the signal output from the prefilter 201.

The reference clock generator 209 may be configured, for example, using a crystal oscillator so as to generate the reference clock signal at a fixed frequency of 108 MHz.

In the present embodiment, the frequency of the reference clock signal supplied to the analog-to-digital converter 202 is set to 108 MHz so that the frequency is slightly higher than the frequency of the detected signal in the 4× reading mode, i.e., 101.6 MHz and the frequency is equal to an integral multiple of 13.5 MHz.

The digital filter 203 performs filtering on the digital data supplied from the analog-to-digital converter 202 so as to achieve the following requirements.

(1) Unnecessary high-frequency components in the reproduced digital data are suppressed.

(2) The number of samples of the digital data is increased thereby to obtain 4× over-sampled data to be used by an interpolator 204 at a next stage.

First, the first requirement (1) is discussed below with reference to FIGS. 7A to 7C.

Figure 7A:
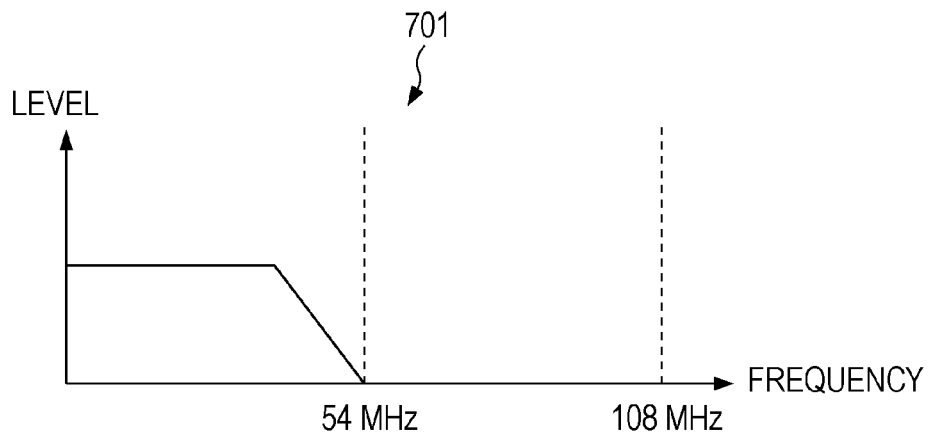
FIGS. 7A, 7B, and 7C are diagrams illustrating frequency characteristics of a prefilter.

In FIG. 7A, a frequency characteristic 701 shows a frequency characteristic of the prefilter 201. As shown in FIG. 7A, the prefilter 201 reduces signal components with frequencies higher than 54 MHz that is one-half the sampling frequency, 108 MHz, of the analog-to-digital converter 202.

Figure 7B:
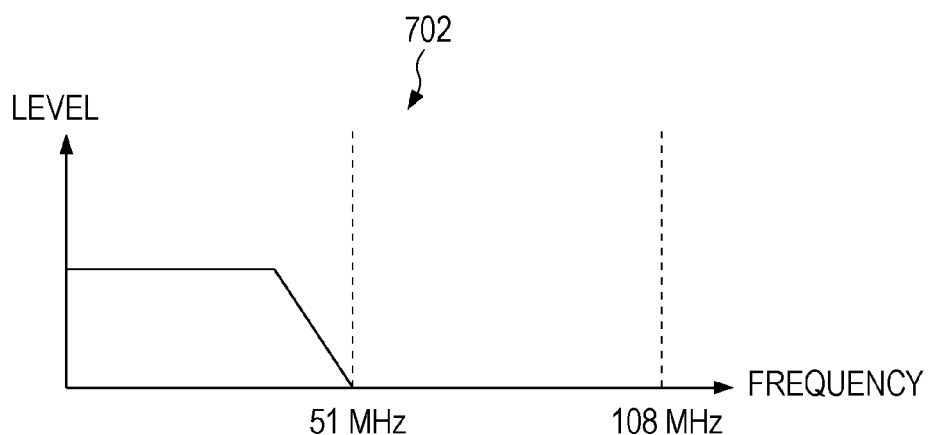

In FIG. 7B, a frequency characteristic 702 shows an overall frequency characteristic 702 of a signal obtained after processes are performed by the digital filter 203 and the interpolator 204 following the analog-to-digital conversion. As can be seen, components in a frequency band higher than 51 MHz are suppressed for the data output from the interpolator 204. Note that, from the point of view that the frequency of the read data is 101.6 MHz, the overall frequency characteristic for the signal subjected to the process performed by the digital filter 203 and the interpolator 204 following the analog-to-digital conversion is sufficient, if signal components in a frequency band higher than 50.8 MHz are suppressed.

Next, the requirement (2) is discussed below.

In the present embodiment, from the digital data obtained as a result of the analog-to-digital conversion according to the reference clock signal, the interpolator 204 at the stage following the digital filter 203 produces read data at a position corresponding to a clock timing synchronous to the detected signal. In order to achieve the above operation, the number of samples of the digital data output from the analog-to-digital converter 202 is increased. More specifically, three samples are inserted between each two adjacent samples of the digital data output from the analog-to-digital converter 202 whereby 4× over-sampled digital data is produced.

The process of producing 4× over-sampled digital data is described in further detail below with reference to FIGS. 4A and 4B.

Figure 4A:
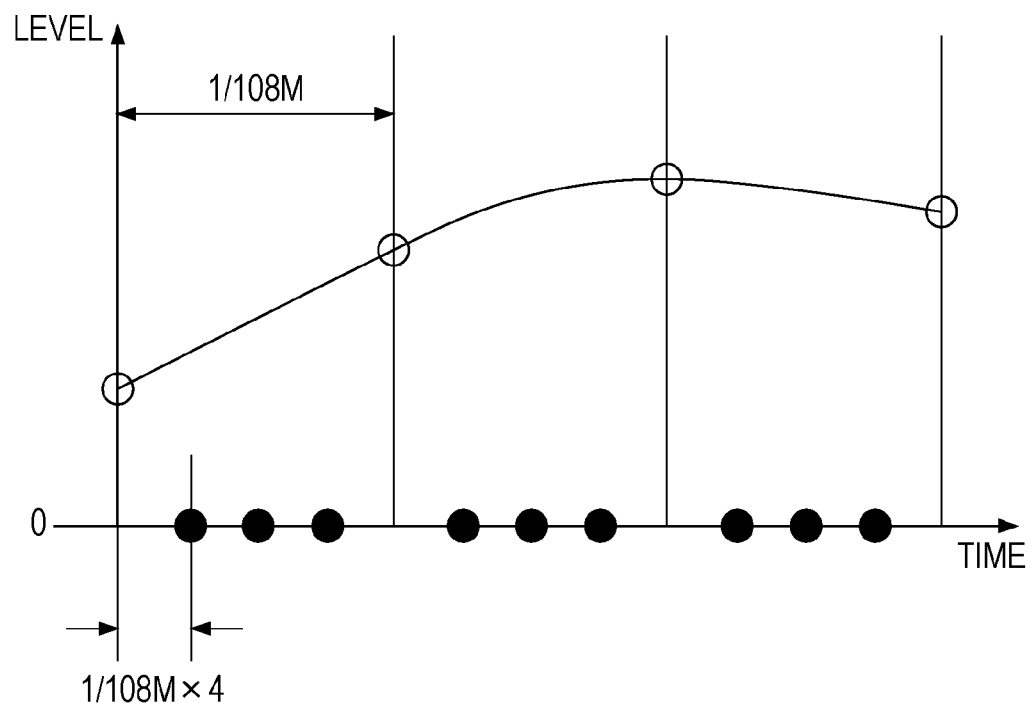
FIGS. 4A and 4B are diagrams illustrating a manner in which 4× over sampled data is produced by a digital filter.

FIG. 4A shows a manner in which three samples are inserted between each two adjacent original samples output from the analog-to-digital converter 202. In FIG. 4A, open circles denote original data output from the analog-to-digital converter 202, while solid circles denote inserted samples. Note that in the state shown in FIG. 4A, inserted samples have a value of 0. Values to be assigned to the respective inserted samples (denoted by solid circles) are determined by interpolation using original samples (denoted by open circles) output from the analog-to-digital converter 202.

Figure 4B:
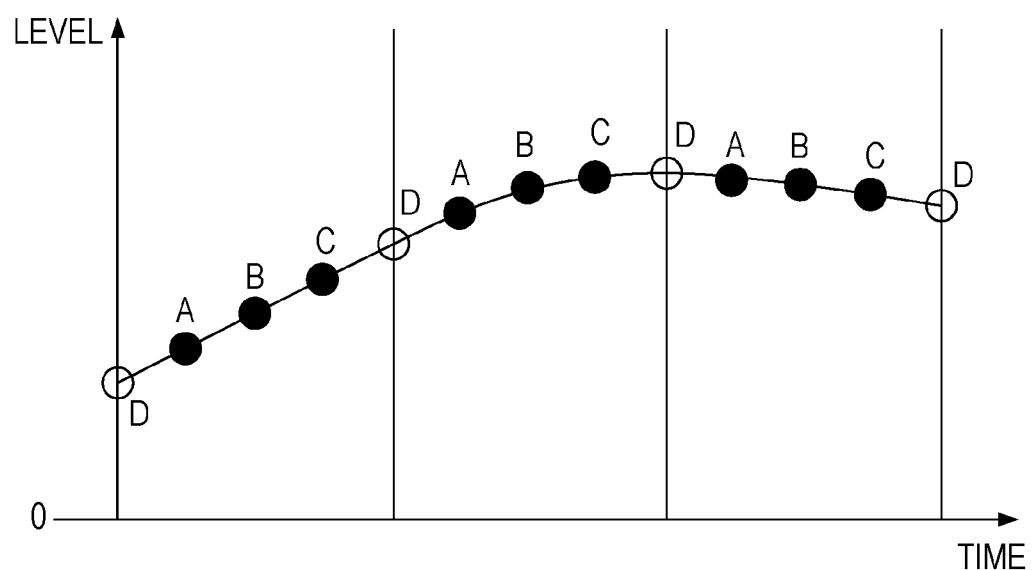

FIG. 4B shows an example of the result of the interpolation.

Values of samples A, B, and C shown in FIG. 4B are calculated using a plurality of sample values D.

FIG. 3 illustrates a configuration of the digital filter 203 adapted to perform the above-described process.

As shown in FIG. 3, to achieve a frequency characteristic necessary in the 2× reading mode, the digital filter 203 has four 20-tap FIR (Finite Impulse Response) filters 301-304 disposed in parallel. A coefficient setting unit 305 sets coefficients of the respective FIR filters in accordance with a mode setting signal supplied from the system controller 108. More specifically, the coefficient setting unit 305 realizes a 10-tap FIR filter by setting some of coefficients of the respective FIR filters in the 4× reading mode. Each FIR filter may include n taps.

The sample of the digital data output from the AD (also referred to as the analog-to-digital converter) 202 is supplied to each of the four FIR filters 301 to 304.

The tap coefficients of the respective FIR filters are set to values corresponding to the sample positions A, B, C, and D shown in FIG. 4B. Each FIR filter calculates the values of the samples A, B, C, and D in FIG. 4B using the input sample values (values of ten successive samples in this specific example). As a result, samples A to D including one sample denoted by an open circuit and three samples denoted by solid circles shown in FIG. 4B are output simultaneously from the FIR filters 301 to 304.

This makes it possible to obtain over-sampled data equivalent to data obtained by performing analog-to-digital conversion at a sampling frequency 4 times higher than the reference clock without having to actually operate the analog-to-digital converter 202 at 108 MHz×4=432 MHz.

Figure 8:
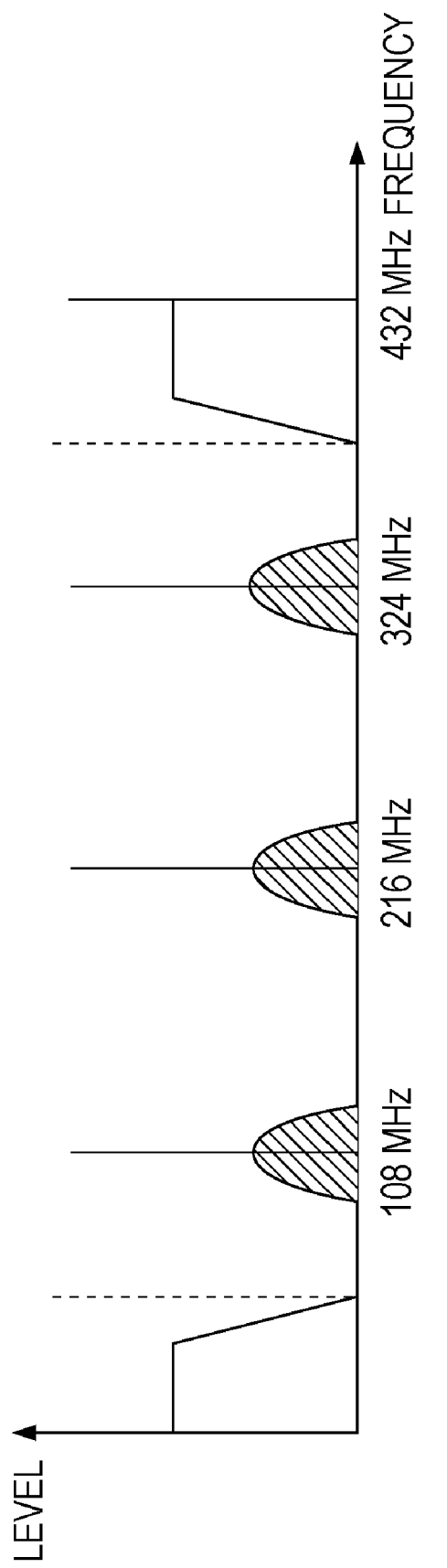
FIG. 8 is a diagram illustrating a frequency characteristic of over-sampled data.

FIG. 8 is a diagram illustrating a filter characteristic of the digital filter 203. Thus, by performing the filtering process using the digital filter 203, it is possible to obtain over-sampled data having no noise in frequency bands denoted by shading in FIG. 8.

As described above, the digital filter 203 increases the number of samples of the detected signal output from the AD (analog-to-digital converter) 202 and suppresses the components in the frequency band higher than one-half the frequency of the read data.

The digital data produced by the digital filter 203 is output as 4-channel data to the interpolator 204.

In addition to the read data, the mode setting signal from the system controller 108 and the information as to frequency change from a loop filter 208 are also supplied to the interpolator 204. In accordance with the mode setting signal, the interpolator 204 detects information indicating the center frequency of the detected signal and calculates timing points of the clock signal synchronous to the read data. The interpolator 204 then produces read data at the timing points calculated.

Figure 5:
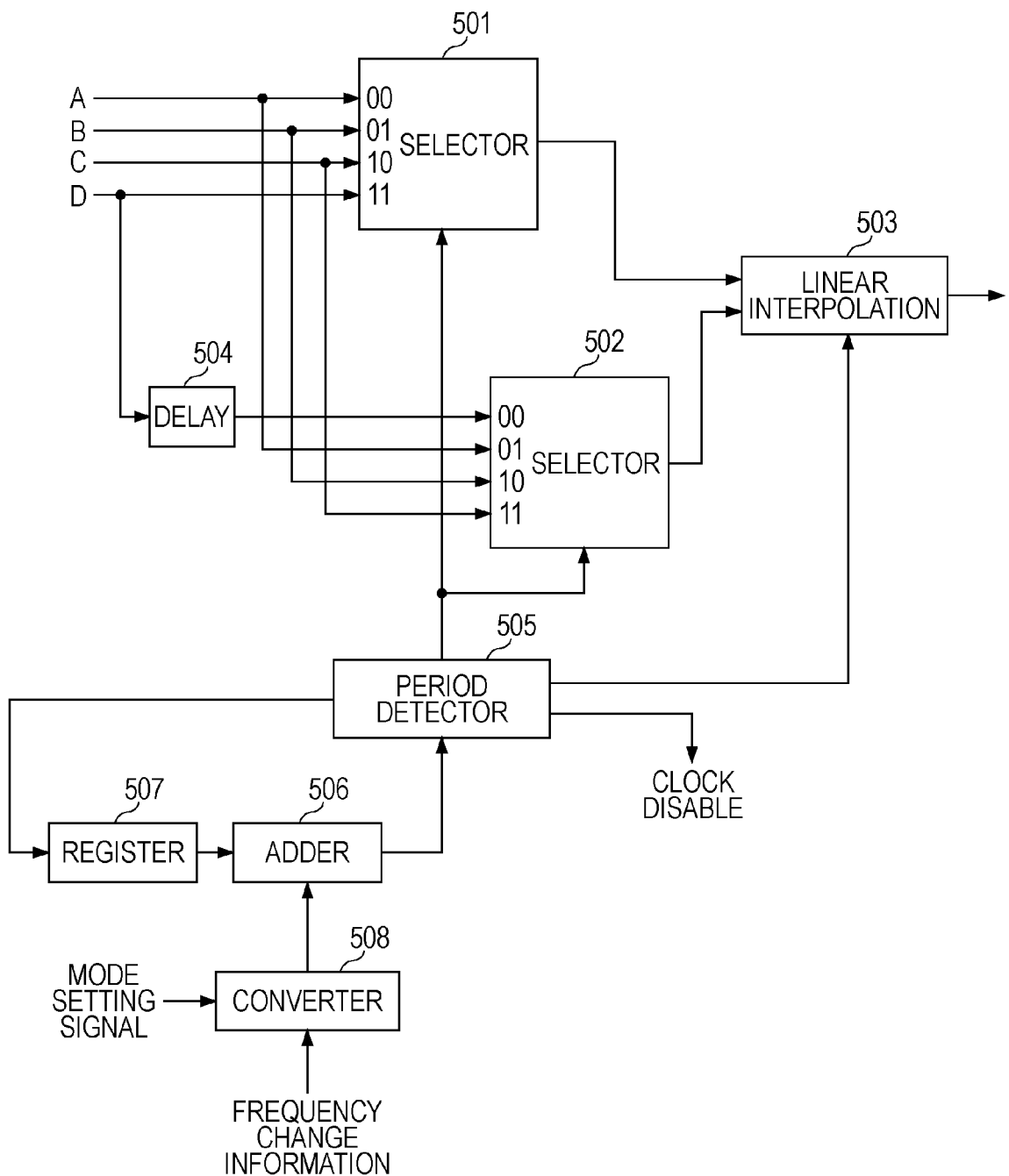
FIG. 5 is a block diagram illustrating a configuration of an interpolation unit.

FIG. 5 is a block diagram illustrating a configuration of the interpolator 204.

As shown in FIG. 5, four samples A to D output in parallel from the digital filter 203 are supplied to both selectors 501 and 502. Note that the sample D is supplied to the selector 502 such that the sample D is delayed by a delay unit 504 by one clock period, and the resultant delayed data is supplied to the selector 502.

In accordance with the reading mode setting signal output from the controller 108, a converter 508 detects the center frequency of the reproducing clock depending on the reading rate. The converter 508 receives, from the loop filter 208, information indicating the frequency change of the clock signal phase-locked to the detected signal. The converter 508 subtracts the value of the frequency change from the center frequency of the reproducing clock and further converts the resultant value into the reciprocal thereof. As a result, a period $\Delta t$ between two adjacent clock timing points is calculated and the resultant value is supplied to an adder 506.

The frequency information supplied from the loop filter 208 to the converter 508 indicates the frequency change of the clock signal phase-locked to the detected signal as described below. By converting this frequency information into clock timing information, it is possible to obtain clock timing points synchronous to the phase change of the read data.

The position information output from a register 507 is input to the adder 506. The register 507 has position information associated with the previous read data with respect to the reference clock point of 108 MHz. The adder 506 adds these values and supplies the resultant value to a period detector 505.

More specifically, the adder 506 calculates the sum of the value output from the register 507 and the value output from the converter 508, and subtracts a predetermined value corresponding to the reference clock period from the sum. The resultant value is output from the adder 506.

The period detector 505 determines whether the clock timing of the read data is within any of four periods each separated by two of sample points A to D. The period detector 505 selects, from the samples A to D, two samples located at respective two ends of the detected period and outputs a 2-bit control signal to the selectors 501 and 502 so as to output the selected two samples to a linear interpolator 503. According to the detection result, the period detector 505 produces time information of the updated clock timing point with respect to the reference clock signal, and supplies the resultant time information to the register 507.

Furthermore, according to the detected period and the time information with respect to the reference clock signal, the period detector 505 outputs a ratio to be used in the interpolation.

Furthermore, the period detector 505 produces a timing signal depending on whether there is a clock timing point of the read data between reference clock signals and outputs the produced timing signal. Note that the timing signal is a signal indicating whether there is read data at a clock timing point indicated by the reference clock signal.

The operation of the interpolator 204 shown in FIG. 5 is described in further detail below with reference to FIG. 6.

Figure 6:
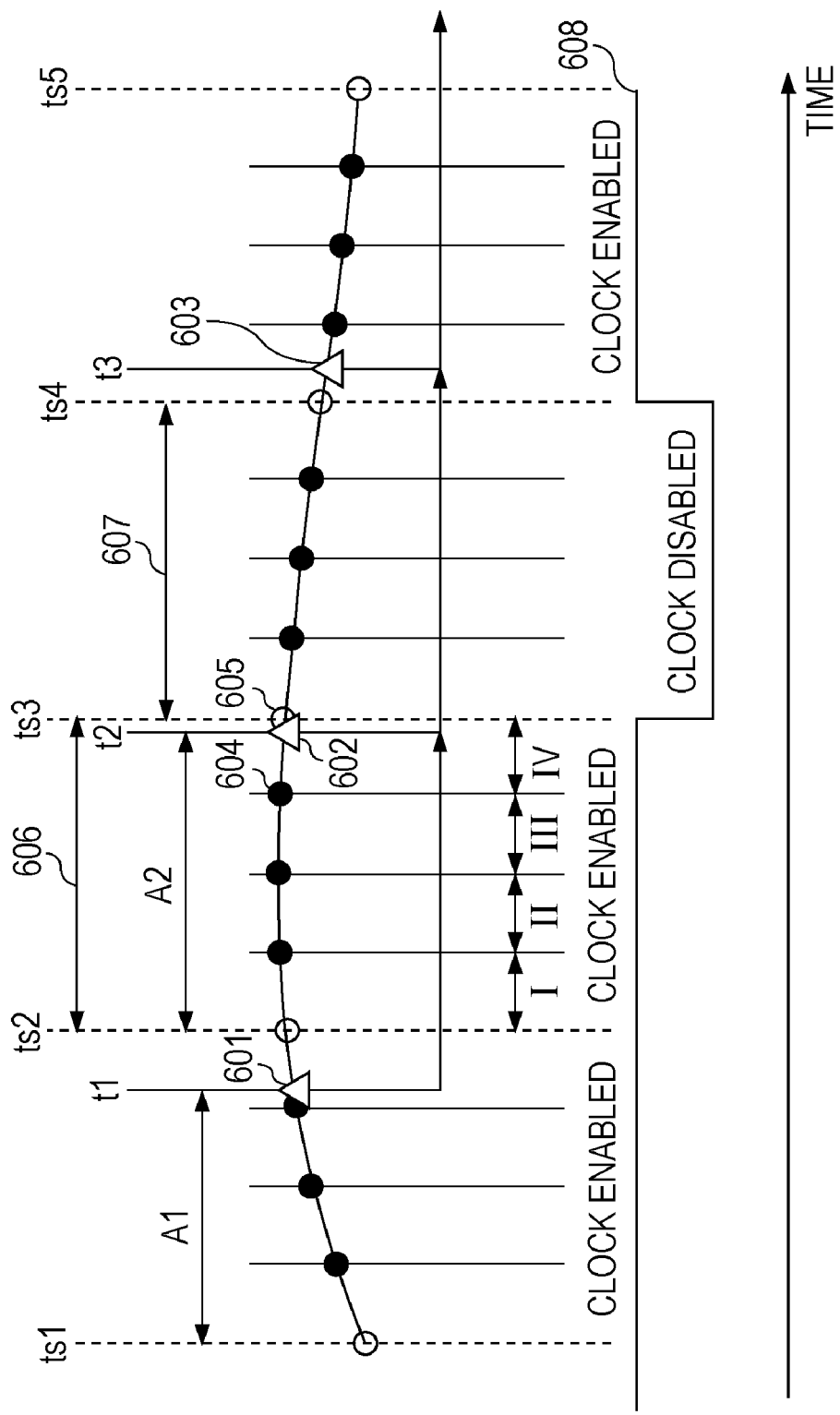
FIG. 6 is a diagram illustrating a period detection process performed by an interpolation unit.

In FIG. 6, as in FIGS. 4A and 4B, open circles denote sampled data output from the analog-to-digital converter 202, and solid circles denote 4× over-sampled data produced by the digital filter 203. Triangles 601 and 602 denote samples to be detected as read data. Furthermore, ts1 to ts5 denote timing points of the reference clock signal at 108 MHz, and t1 and t2 denote positions (timing points) of the read data according to the clock phase-locked to the read data in the 4× over-sampled data.

In the following description, by way of example, the process of producing detected data 602 is discussed.

In this case, the register 507 has data stored therein which indicates a value of a time difference A1 of a previous data detection point t1 from a timing point ts of the reference clock signal. The converter 508 determines the clock period $\Delta t$ of the read data by calculating the reciprocal of the frequency information supplied from the loop filter 208. Thereafter, $\Delta t$ is added to t1 thereby to determine a next clock timing point t2 synchronous to the read data. As a result, the value stored in the register 507 is updated to a value A2 indicating the difference between reference clock timing points ts and t2.

The period detector 505 then determines, on the basis of the value of A2, in which period in the period 606 of the reference clock signal the position of the read data is located.

More specifically, the period 606 of the reference clock is divided into four periods I to IV such that two ends of each period is defined by two adjacent samples included in the period 606. Thereafter, a determination is made as to which of these four periods includes the position t2 of the read data.

In the example shown in FIG. 6, the position t2 of the read data is located in the period IV.

Thus, samples 604 and 605 located at the respective two ends of the period IV are selected by the selectors 501 and 502. The values of these two selected samples are combined at a ratio determined according to the position of the detected data thereby to determine the value of the data at the detection timing point of the read data.

Similarly, at a next timing point t3 of the clock synchronous to the read data, the value of the detected data is calculated. In this specific case, there is no clock point of the read data between the reference clock points ts3 and ts4, and thus the clock is disabled. In FIG. 6, reference numeral 608 denotes a timing signal by which to enable/disable the clock. The timing signal 608 is a binary signal that can take two logical levels, i.e., a logical H (high) level and a logical L (low) level. The timing signal is supplied to the Viterbi decoder 205, the demodulator 206, the phase detector 207, and the loop filter 208 shown in FIG. 2. These circuits operate only during each clock-enabled period in which the timing signal 608 is at the logical H level.

In the 4× reading mode, the clock frequency of the read data is 101.6 MHz, while the reference clock frequency is 108 MHz. Therefore, once every several clock periods, the clock of 108 MHz has a period in which there is no clock timing point of the read data. In the example shown in FIG. 6, this occurs in the period 607.

As described above, after the number of samples is increased by the digital filter 203, the values of these added samples are calculated by the interpolator 204 thereby producing the read data. This makes it possible to more accurately determine the values of the read data than can be in the case where the read data is obtained by the calculation using only samples (denoted by open circles in FIG. 4) output from the AD 202 without increasing the number of samples.

Referring again to FIG. 2, the data output from the interpolator 204 is supplied to the Viterbi decoder 205 and the phase detector 207.

For any period in which there is no detection timing point of the read data, the timing signal 608 is turned off to the logical L level to disable the clock, and the timing signal 608 is supplied to the Viterbi decoder 205, the demodulator 206, the phase detector 207, and the loop filter 208.

The Viterbi decoder 205 detects one sample of 1-bit binary digital data from the read data output from the interpolator 204, and supplies the detected sample data to the demodulator 206. The demodulator 206 performs a demodulation process on the detected data and supplies the resultant data to the reproducing unit 106 shown in FIG. 1.

The phase detector 207 detects the phase of the reproduced information signal on the basis of the reproduced signal level at each clock point synchronous to the read data output from the interpolator 204. The detected phase signal is supplied to the loop filter 208. The loop filter 208 converts the phase signal supplied from the phase detector 207 into frequency information by performing a lag/lead integration process on the phase signal. The resultant frequency information is supplied to the interpolator 204. Thus, the interpolator 204, the phase detector 207, and the loop filter 208 form a PLL (Phase-Locked Loop) that produces the clock synchronous to the read data.

A description has been given above as to the process of reproducing the signal while rotating the disk D at the velocity 4 times higher than the normal speed. Now, a process is described below for the case where the data is read at the 2× reading rate from the disk D.

In the 2× data reading mode, the frequency of the read is one-half the frequency in the 4× data reading mode.

More specifically, the frequency of the read signal in the 4× data reading mode is 101.6 MHz, while the frequency in the 2× data reading mode is 50.8 MHz.

Therefore, for the signal obtained by sampling the read signal at 50.8 MHz by the analog-to-digital converter, the prefilter suppresses signal components in the frequency band higher than one-half the frequency of 50.8 MHz, i.e., 25.4 MHz.

However, in the present embodiment, also in the 2× reading mode, the reference clock with a frequency of 108 MHz, which is the same as in the 4× reading mode, is supplied to the analog-to-digital converter 202. Therefore, the prefilter 201 has the same passband width as that in the 4× reading mode, i.e., the passband width of the prefilter 201 in the 2× reading mode is 54 MHz.

In the 2× reading mode, the digital filter 203 and the interpolator 204 operate differently from the 4× reading mode.

In the present embodiment, also in the 2× reading mode, the digital filter operates in accordance with the reference clock of 108 MHz. Therefore, in the 2× reading mode, the filter has a narrower band than in the 4× reading mode. The digital filter 203 is configured using four 20-tap FIR filters as shown in FIG. 3.

In the 2× reading mode, the coefficient setting unit 305 shown in FIG. 3 sets the tap coefficients of the respective FIR filters for the respective sample positions A, B, C, and D shown in FIG. 4B. Each FIR filter performs a calculation using input samples (20 successive samples in this specific example) to obtain the value of the sample A, B, C, or D shown in FIG. 4B. As a result, samples A to D including one sample denoted by an open circuit and three samples denoted by solid circles shown in FIG. 4B are output simultaneously from the FIR filters 301 to 304, as in the case of the 4× reading mode.

In the present embodiment, as described above, the same digital filter 203 is used in both the 4× and 2× reading modes. To this end, the tap coefficients of the 20-tap FIR filters in the 2× reading mode are properly changed to realize the 10-tap FIR filters in the 4× reading mode.

The system controller 108 controls the interpolation process performed by the interpolator 204 depending on whether the operation is in the 4× or 2× reading mode.

Figure 7C:
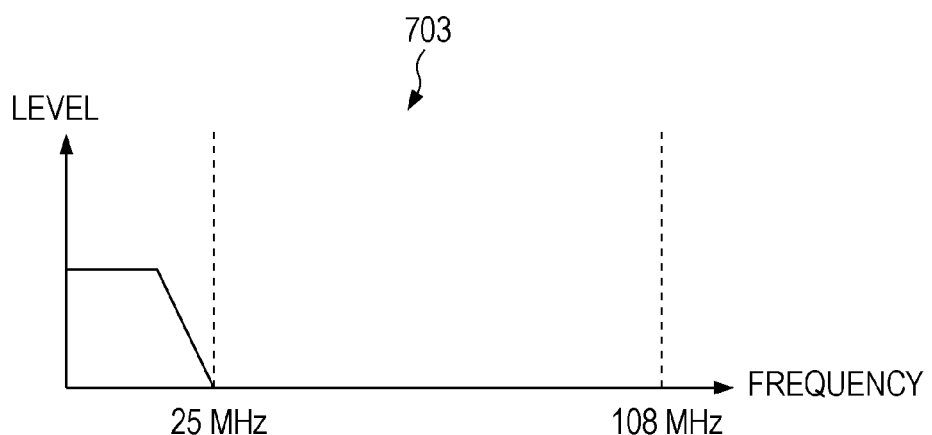

In FIG. 7C, a frequency characteristic 703 illustrates the overall frequency characteristic obtained via the processes performed by the analog-to-digital converter 202, the digital filter 203, and the interpolator 204 in the 2× reading mode.

As described above, the digital filter 203 increases the number of samples of the read signal output from the AD 202 and suppresses the signal components in the frequency band higher than one-half the frequency of the read data.

As for the operation of the interpolator 204, the center frequency information is changed according to the mode setting signal supplied from the system controller 108. However, the operation is similar in that the reference clock period is divided into four sub periods and the determination is made as to which of these four sub periods the clock timing point of interest of the read data is located in.

Figure 9:
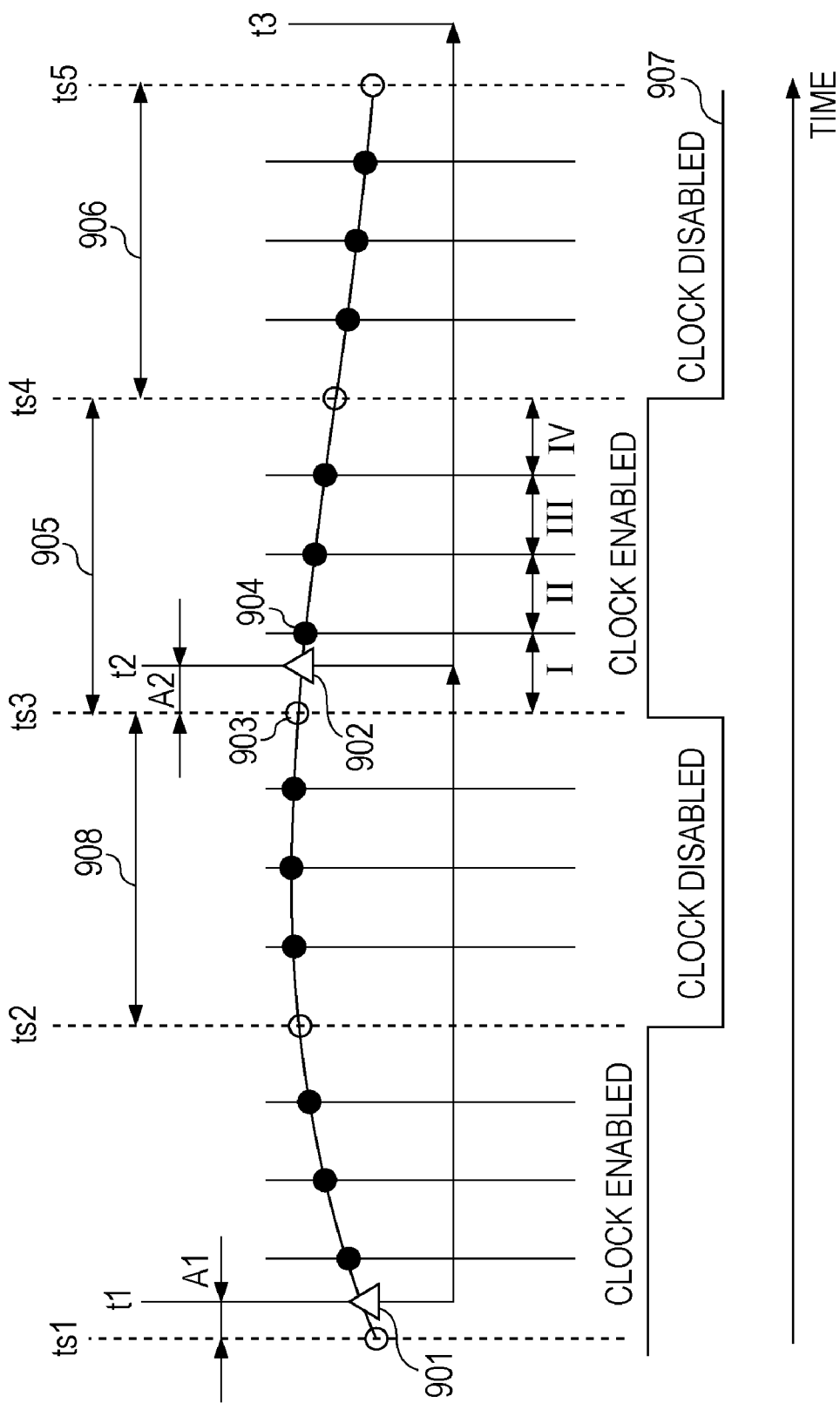
FIG. 9 is a diagram illustrating a period detection process performed by an interpolation unit.

Referring to FIG. 9, the process performed by the interpolator 204 in the 2× reading mode is explained below.

In FIG. 9, as in FIGS. 4A and 4B and FIG. 6, open circles denote sampled data output from the analog-to-digital converter 202, and solid circles denote 4× over-sampled data produced by the digital filter 203. Triangles 901 and 902 denote samples to be detected as read data. Furthermore, in FIG. 9, ts1 to ts5 denote timing points of the reference clock signal at 108 MHz, and t1 and t2 denote positions at which the read data is detected in accordance with the clock phase-locked to the read data. In the 2× reading mode, the frequency of the read signal is 50.8 MHz.

In the following description, by way of example, the process of generating detected data 902 is discussed.

In this case, the register 507 has data stored therein which indicates a value of a time difference A1 of a previous data detection point t1 from a timing point ts of the reference clock signal. The converter 508 determines the clock period Δt of the read data by calculating the reciprocal of the reading clock frequency. Thereafter, Δt is added to t1 thereby to determine a next clock timing point t2 synchronous to the read data. As a result, the value stored in the register 507 is updated to a value A2 indicating the difference between reference clock timing points ts and t2.

In this specific case, there is no clock point of the read data between the reference clock points ts2 and ts3, and thus the clock is disabled. In FIG. 9, reference numeral 907 denotes a timing signal by which to enable/disable the clock. Note that the timing signal 907 is a binary signal that can take two logical levels, i.e., a logical H (high) level and a logical L (low) level, as in the case shown in FIG. 6. The timing signal 907 is supplied to the Viterbi decoder 205, the demodulator 206, the phase detector 207, and the loop filter 208 shown in FIG. 2. These circuits operate only during each clock-enabled period.

On the basis of the value of A2, the period detector 505 determines which subperiod of the reference clock period 905 the clock timing point of interest of the read data is located in.

More specifically, the reference clock period 905 is divided into four periods I to IV such that two ends of each period is defined by two adjacent samples included in the period 905, and it is determined which of these four periods I to IV the clock timing point t2 of the read data is located in.

In the example shown in FIG. 9, the clock timing point t2 is located in the period I.

Thus, samples 903 and 904 located at the respective two ends of the period I are selected by the selectors 501 and 502. The value of the data 902 at the detection timing point of the read data is then calculated by the linear interpolation using the values of the sample 903 and 904.

Similarly, at a next timing point t3 of the clock synchronous to the read data, the value of the read data is calculated. In this specific case, there is no clock point of the read data between the reference clock points ts4 and ts5, and thus the clock is disabled.

In the 2× reading mode, the clock frequency of the read data is 50.8 MHz, while the reference clock frequency used in the analog-to-digital conversion process is 108 MHz. Because of this difference in the frequency, once every two clock periods, the clock of 108 MHz has a period in which there is no clock timing point of the read data. In the example shown in FIG. 9, the clock is disabled during periods 906 and 908.

In the present embodiment, as described above, the read data is converted from analog form into digital form in accordance with the reference clock with the frequency higher than the frequency of the read data.

After the analog-to-digital conversion, the digital filter suppresses signal components in an unnecessary frequency band in the read signal. More specifically, the digital filter suppresses signal components in a frequency band higher than one-half the frequency of the read signal. The digital filter also operates so as to increase the number of samples of the digital data and calculate the sample value of the read data by the interpolation using values of two sample points adjacent to the clock point of interest synchronous to the read data.

Thus, in both the 2× and 4× reading modes, the same analog prefilter of the analog-to-digital converter can be used.

For any frequency of the read signal lower than the reference clock frequency, the sampling frequency of the analog-to-digital converter is fixed and thus the same prefilter of the analog-to-digital converter can be used.

On the other hand, the frequency band in which the signal components are suppressed varies depending on the frequency of the read signal, and thus the frequency band is switched depending on the reading rate by switching the frequency characteristic of the digital filter located after the analog-to-digital converter.

For example, the rate at which to read data from the disk D is assumed to be 4 times the normal rate, and the operation frequency of the analog-to-digital converter is set based on the frequency of the read signal, i.e., 101.6 MHz. The analog-to-digital converter capable of operating in this manner may be implemented in a digital signal processor LSI.

In this case, even, if the operating frequency of the analog-to-digital converter is reduced to 50.8 MHz in the 2× reading mode, no significant reduction in power consumption occurs because high-current transistors are used in various parts of the analog-to-digital converter to achieve the high operating speed.

No advantage is obtained by reducing the operating frequency of the analog-to-digital converter as described above. Thus, in the present embodiment, the clock frequency of the analog-to-digital converter is maintained unchanged, and the analog-to-digital converter is operated at the fixed reference frequency. This makes it possible to implement the prefilter, which is an analog circuit, in a simple form. The band limiting of the read data is performed using the digital filter depending on the reading rate. More specifically, the signal components in the frequency band higher than one-half the frequency of the read data are suppressed by the digital filter.

The frequency characteristic of the digital filter can be changed easily by properly setting the number of taps and the tap coefficients.

This provides a great advantage over a case in which as many large-scale analog filters are used as there are reading modes, and thus it is possible to achieve reduction in cost, consumption power, and installation space.

In the embodiments described above, the invention is applied to an apparatus configured to reproduce a signal recorded on a disk medium. Note that the present invention is also applicable to apparatuses configured to reproduce a signal from other types of storage media.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-285166 filed Nov. 1, 2007, which is hereby incorporated by reference herein in its entirety.

What is claimed is:

1. A reproducing apparatus comprising:
a reading unit configured to read an information signal from a storage medium;
a conversion unit configured to convert the information signal into a first digital signal by sampling the information signal in accordance with a reference clock signal with a predetermined frequency higher than the frequency of the information signal;
a sample increasing unit configured to produce a second digital signal by increasing the number of samples of the first digital signal output from the conversion unit; and
a data detection unit configured to select two adjacent samples from the second digital signal based on a frequency of the information signal read by the reading unit and a phase change of the information signal and generate read data using the selected samples of the digital signal,
wherein the data detection unit detects the position of the read data on the second digital signal based on the frequency of the information signal read by the reading unit and the phase change of the information signal, and selects the two adjacent samples one of which is located before the detected position and the other after the detected position.

2. The reproducing apparatus according to claim 1, wherein the data detection unit generates the read data by combining the two selected samples of digital signal at a ratio determined according to the detected position.

3. The reproducing apparatus according to claim 1, further comprising a phase detection unit configured to detect a phase change in the read information signal in accordance with the read data output from the data detection unit.

4. The reproducing apparatus according to claim 1, further comprising a clock generator configured to generate the reference clock signal.

5. A reproducing apparatus comprising:
a reading unit configured to read an information signal from a storage medium;
a conversion unit configured to convert the information signal into a first digital signal by sampling the information signal in accordance with a reference clock signal with a predetermined frequency higher than the frequency of the information signal;
a sample increasing unit configured to produce a second digital signal by increasing the number of samples of the first digital signal output from the conversion unit; and
a data detection unit configured to select two adjacent samples from the second digital signal based on a frequency of the information signal read by the reading unit and a phase change of the information signal and generate read data using the selected samples of the digital signal, wherein the reproducing apparatus has first and second modes, the first mode being a mode in which the information signal is read at a first rate, the second mode being a mode in which the information signal is read at a second rate higher than the first rate, and wherein the conversion unit performs the sampling on the read information signal in accordance with the reference clock signal regardless in both the first and second modes.

6. The reproducing apparatus according to claim 5, wherein the sample increasing unit includes an n-tap filter configured to increase the number of samples by performing a filtering process on the first digital signal, a frequency characteristic of the filter being switched between the first mode and the second mode.

7. A reproducing apparatus comprising:
a reading unit configured to read an information signal from a storage medium;
a conversion unit configured to convert the information signal into a first digital signal by sampling the information signal in accordance with a reference clock signal with a predetermined frequency higher than the frequency of the information signal;
a sample increasing unit configured to produce a second digital signal by increasing the number of samples of the first digital signal output from the conversion unit;
a data detection unit configured to select two adjacent samples from the second digital signal based on a frequency of the information signal read by the reading unit and a phase change of the information signal and generate read data using the selected samples of the digital signal; and
a data processing unit configured to process the read data output from the data detection unit in accordance with the reference clock signal,
wherein the data detection unit generates a timing signal indicating whether there is read data at a clock timing point indicated by the reference clock signal, and
the data processing unit processes the read data in accordance with the timing signal.

8. A reproducing apparatus comprising:
a reading unit configured to read an information signal from a storage medium;
an analog filter configured to receive the information signal read by the reading unit, process the received information signal such that signal components thereof in a frequency band higher than one-half the reference clock frequency are suppressed, and output the resultant signal;
a conversion unit configured to convert the information signal into a first digital signal by sampling the information signal in accordance with a reference clock signal with a predetermined frequency higher than the frequency of the information signal;
a sample increasing unit configured to produce a second digital signal by increasing the number of samples of the first digital signal output from the conversion unit,
wherein the sample increasing unit includes a digital filter configured to increase the number of samples of the first digital signal, process the first digital signal so that signal components in a frequency band higher than one-half the frequency of the read information signal are suppressed, and output the resultant signal; and
a data detection unit configured to select two adjacent samples from the second digital signal based on a frequency of the information signal read by the reading unit and a phase change of the information signal and generate read data using the selected samples of the digital signal.

9. A reproducing apparatus comprising:
a reading unit configured to read an information signal from an optical disk;
a clock generator configured to generate a reference clock signal with a predetermined frequency higher than the frequency of the information signal;
an analog filter configured to suppress signal components of the information signal read by the reading unit in a frequency band higher than one-half the reference clock frequency and output the resultant information signal;
an analog-to-digital converter configured to sample the information signal output from the analog filter into a first digital signal in accordance with the reference clock;
a digital filter configured to increase the number of samples of the first digital signal output from the analog-to-digital converter and process the first digital signal so that signal components thereof in a frequency band higher than one-half the frequency of the information signal are suppressed;
an interpolation unit configured to generate read data by selecting two adjacent samples from a second digital signal output from the digital filter, based on a frequency of the information signal and a phase change of the information signal and then calculating the value of the read data using the two selected samples of the digital signal; and
a phase detector configured to detect the phase change on the basis of the read data output from the interpolation unit.

10. The reproducing apparatus according to claim 9, wherein the digital filter and the interpolation unit operate in accordance with the reference clock signal.

11. A reproducing apparatus comprising:
a reading unit configured to read an information signal from a storage medium;
a setting unit configured to set a mode into a first mode or a second mode, the first mode being a mode in which the information signal is read at a first rate, the second mode being a mode in which the information signal is read at a second rate higher than the first rate;
a clock generator configured to generate a reference clock signal with a frequency higher than the frequency of the information signal read in the second mode;
an analog filter configured to suppress signal components of the information signal read by the reading unit in a frequency band higher than one-half the reference clock frequency and output the resultant information signal, in the first mode and the second mode;
an analog-to-digital converter configured to sample the information signal output from the analog filter into a digital signal in accordance with the reference clock signal;
a digital filter to which the digital signal output from the analog-to-digital converter is input; and
a controller configured to, in accordance with the mode set by the setting unit, change the frequency band in which signal components are suppressed by the digital filter.

12. The reproducing apparatus according to claim 11, wherein the controller changes the frequency band in which the signal components are suppressed by the digital filter such that in the first mode, signal components in a frequency band higher than one-half the frequency of the information signal read in the first mode are suppressed, while in the second mode, signal components in a frequency band higher than one-half the frequency of the information signal read in the second mode are suppressed.

* * * * *